UNITED STATES PATENT OFFICE.

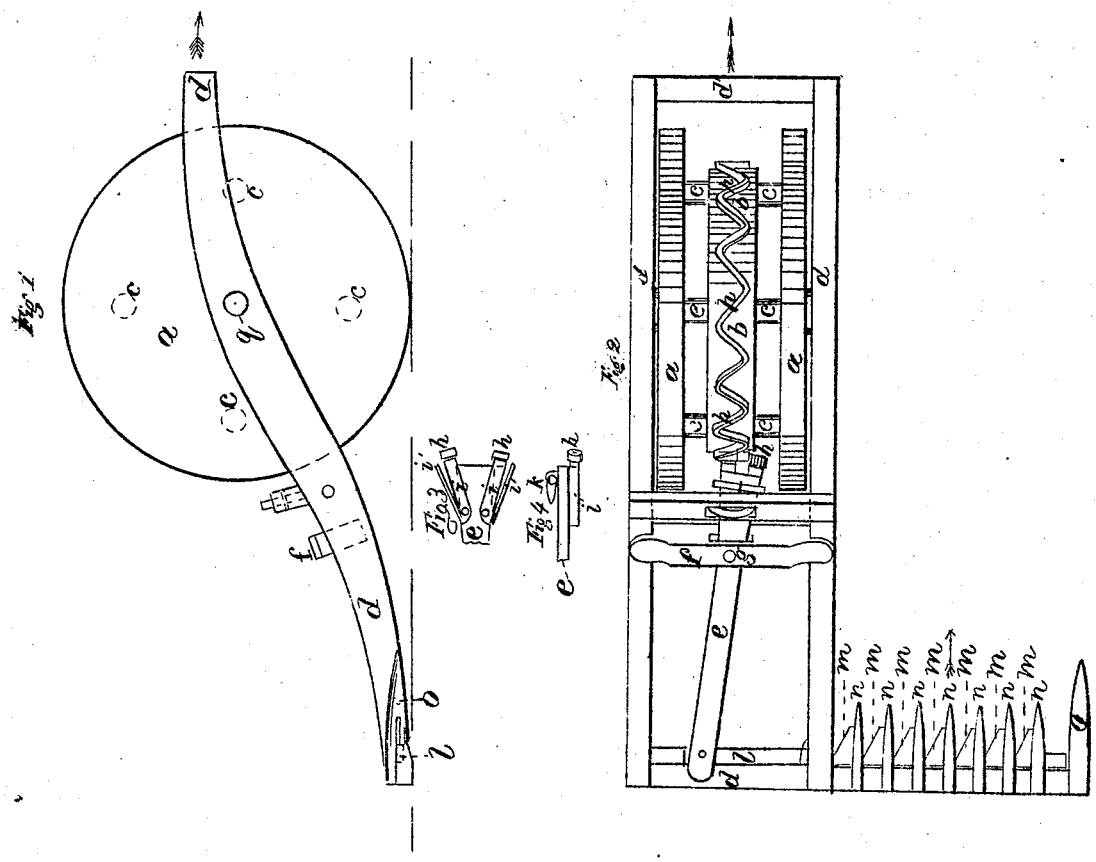

C. WILSON AND WM. MOORE, JR., OF YARDLEYVILLE, PENNSYLVANIA.

IMPROVEMENT IN MOWING-MACHINES.

Specification forming part of Letters Patent No. 12,980, dated May 29, 1855.

*To all whom it may concern:*

Be it known that we, COURTLAND WILSON and WILLIAM MOORE, Jr., of Yardleyville, in the county of Bucks and State of Pennsylvania, have invented a new and useful Improvement in Mowing-Machines; and we do hereby declare that the following is a full and exact description thereof.

The nature of our invention consists in providing the end of the cutter-bar lever with two elastic prongs or jaws for supporting the friction-rollers, and employing, in combination with the same, a bracket-shaped clamp so arranged and attached to the top of the cutter-bar lever that by turning its ends down it shall force the said jaws together and cause the friction-rollers to bear snugly against the serpentine cam, and by turning it up it shall be out of the way and admit of the jaws flying out of connection with the cam. By this arrangement all irregularities caused by shrinkage in the cam-casting will be compensated for, the springs yielding in case one part of the cam is higher than another and preventing strainage. The action of the cutters will also be always certain, no matter how imperfect the casting, as the springs allow of the rollers accommodating themselves to the shape of the cam and at the same time, in connection with the clamp, keep them rigidly in contact with the cam. The cutting operation can also be instantly stopped, in case of necessity, and again proceeded with with like facility, for by simply turning up the ends of the clamp the cutting will be stopped, the spring-jaws flying out of contact with the cam the instant the same is done, and the cutting operation consequently ceasing, and by again turning down the ends of the clamp the jaws will come in contact with the cam and the cutting again commences.

To enable others skilled in the art to make and use our invention, we will proceed to describe its construction and operation, reference being had to the annexed drawings, in which—

Figure 1 is a side view; Fig. 2, a top view; Fig. 3, a bottom view of one portion of the lever; Fig. 4, a side view of the same.

$a$ represents the driving-wheels; $b$, cam-wheel; $c$, pins; $d\ d'$, frame; $e$, knife-lever; $f$, brace; $g$, bearing; $h$, friction-rollers; $i$, clamps; $i'\ i'$, springs; $k$, stop; $l$, cutter-bar; $m$, cutters; $n$, cutter-guards; $o$, guide; $p$, cam.

Our driving-wheels $a$ are constructed in the usual manner, and arranged between a frame, $d$, as shown in the drawings. The horses are attached at $d'$, and the machine moves, when in operation, in the direction indicated by the arrow. The cam-wheel $b$ is placed between the driving-wheels $a$ and secured in its position by means of the pins $c$. The circumference of the cam-wheel $b$ is furnished with an endless irregular cam, $p$. This cam $p$ is elevated above the surface of the cam-wheel $b$ far enough to impart to the cam-lever $e$ such a motion as will insure the proper operation of the cutters $m$. One end of the cam-lever $e$ is furnished with clamps $i$ and friction-rollers $h$. The object of these clamps $i$ is to clasp the sides of the cam $p$.

$k$ is a stop, which, on being turned down, causes the clamps $i$ to come nearly together and clasp the sides of the cam $p$, the friction-rollers $h$ relieving, in a great degree, the friction consequent upon such a combination. The clamps $i$ are furnished with springs $i'$, which serve to assist in fastening the clamps $i$ in their places when the stop $k$ is turned down. When it is desired to prevent the cam-lever $e$ from operating the stop $k$ is turned up, as shown in Fig. 4, which permits the clamps $i$ to spread, so that they will not operate on the cam $p$; but when the stop $k$ is turned down, as shown in Fig. 2, the cam-lever $e$, having a bearing at $g$, receives a vibratory motion corresponding to the irregularities of the cam $p$. The cam-lever $e$ is connected with the cutter-bar $l$, and as the cutters $m$ are attached to the cutter-bar $l$ they receive the necessary vibratory motion to enable them to cut down the grass as fast as the machine moves along. The cutters $m$ and guard $n$ are constructed in the usual manner.

What we claim is—

The application of the spring prongs or jaws $i'\ i'$ and stop $k$, substantially as and for the purposes set forth.

COURTLAND WILSON.
    WILLIAM MOORE, JR.

Witnesses:
 JAMES MARTIN, Jr.,
 WM. C. ELY.